(12) United States Patent
Pourseyed et al.

(10) Patent No.: US 7,345,636 B2
(45) Date of Patent: Mar. 18, 2008

(54) DIELECTRIC ENCAPSULATING ANTENNA

(75) Inventors: Behrouz Pourseyed, Vancouver (CA); Dan Florescu, Burnaby (CA); David Caesar, North Vancouver (CA)

(73) Assignee: Sierra Wireless, Inc., Richmond (CA)

( * ) Notice: Subject to any disclaimer, the term of this patent is extended or adjusted under 35 U.S.C. 154(b) by 0 days.

(21) Appl. No.: 11/404,064

(22) Filed: Apr. 12, 2006

(65) Prior Publication Data

US 2006/0256032 A1 Nov. 16, 2006

Related U.S. Application Data

(60) Provisional application No. 60/670,932, filed on Apr. 12, 2005.

(51) Int. Cl.
*H01Q 1/24* (2006.01)

(52) U.S. Cl. ....................... 343/702; 343/906

(58) Field of Classification Search ................. 343/702, 343/711, 713, 872, 700 MS, 906
See application file for complete search history.

(56) References Cited

U.S. PATENT DOCUMENTS 5,184,145 A 2/1993 Devillers et al.
5,809,663 A 9/1998 Perque
6,259,411 B1 * 7/2001 Yanagisawa et al. ....... 343/713
6,788,259 B2 * 9/2004 Amano et al. .............. 343/702

FOREIGN PATENT DOCUMENTS

GB 2 385 021 A 8/1998
WO WO/93/20537 10/1993

OTHER PUBLICATIONS

International Search Report, PCT/CA2006/000566, dated Aug. 3, 2006.

* cited by examiner

*Primary Examiner*—Hoang V. Nguyen
(74) *Attorney, Agent, or Firm*—Thelen Reid Brown Raysman & Steiner LLP

(57) ABSTRACT

An apparatus and method for providing a broadband antenna is disclosed. For one embodiment of the invention, a molded antenna structure is provided having a gap between electrical components on the printed circuit assembly (PCA) and an overmolding of the antenna structure. One embodiment of the invention substantially reduces the degradation of the antenna performance in wideband modes of operation compared with prior art overmolding schemes. For one embodiment of the invention, the gap between the electrical components and the overmolding is formed by implementing a "cap" (covering) over the components on the PCA such that they are substantially surrounded by air between the cap and the PCA surface.

18 Claims, 8 Drawing Sheets

DIELECTRIC ENCAPSULATING ANTENNA

CROSS-REFERENCE TO RELATED APPLICATION

This application is a non-provisional application claiming priority to provisional application Ser. No. 60/670,932, filed on Apr. 12, 2005, entitled "Dielectric Encapsulating Antenna," which is herein incorporated by reference in its entirety.

FIELD OF THE INVENTION

Embodiments of the invention relate generally to the field of antennas for communication devices and more specifically to an antenna having a gap between an antenna matching circuit and an antenna overmolding.

BACKGROUND OF THE INVENTION

Typically multi-band and multi-mode operation technologies such as Edge, UMTS, and other 3G technologies employ a wideband antenna to support the wide operating frequency operating range. Such antennas typically consist of a connector to attach the antenna to a wireless communication device, a matching circuit on a small printed circuit assembly to match the wireless communication device to the antenna, and the actual "wire" antenna. Portions of the connector, the matching circuit, and the wire antenna are then molded in plastic to provide rigidity to the combined structure as well as electrical and mechanical protection to the matching circuit. This overmolding completely encapsulated parts of the antenna connector assembly, the printed circuit assembly and the electronic matching components, and the lower hinge part of the antenna assembly.

FIG. 1 illustrates an exemplary dual band antenna providing an overmolding in accordance with the prior art. The antenna has electrical components that make up the matching circuit. The electrical components of the matching circuit include inductors and capacitors that provide a dual band resonant matching function such that the antenna is most efficient in the 790-1020 MHz band and the 1750-2010 MHz band.

FIG. 2 illustrates the matching circuit of a conventional dual band antenna in accordance with the prior art.

As shown in FIG. 1, the matching circuit is overmolded (e.g., encapsulated with plastic) to provide structural support and protection for the antenna system. A disadvantage of such a scheme is that the overmolding significantly alters the electrical characteristics of the antenna.

FIG. 3 illustrates the difference in the measured bandwidth between an antenna assembly that has been overmolded and an antenna assembly that has not been overmolded in accordance with the prior art. As shown in FIG. 3, one of the many parameters which can be used to characterize an antenna's performance is the Voltage Standing Wave Ratio (VSWR). VSWR is the ratio of the maximum/minimum values of standing wave pattern along a transmission line to which a load is connected. VSWR value ranges from 1 (matched load) to infinity for a short or an open load. Typically, the maximum acceptable VSWR value for wireless antennas is approximately 2.0. This is approximately the same as a Return Loss of 9.5 dB. Such a return loss indicates that most of the signal from the transmitter to the antenna is being radiated (i.e., 90% radiated and 10% reflected). A VSWR value of 1.5 (return loss of 14.5 dB), which indicates that 96% of the signal is radiated and 4% reflected, is considered excellent.

As illustrated by FIG. 3, in which the VSWR was measured for the same antenna with (x) and without (o) overmolding, overmolding has the effect of changing the characteristics of the matching circuit such that the bandwidth of the 1750-2010 MHz band is decreased and the band center is shifted lower. This is due to the overmolding, which has a dielectric constant greater than that for air (i.e., approximately free space). Typically overmolding is made of plastic or rubber, but can be made of a variety of materials. The overmolding used to obtain the comparison data of FIG. 3 was Santoprene Thermoplastc Elastomer, which has a dielectric constant of 2.3, whereas air has a dielectric constant of 1.00054. For reference, the dielectric constant of a vacuum is 1.00000.

There are several reasons for the significant change in electrical characteristics of the antenna resulting from the overmolding. In practice, all passive electronic components exhibit parasitic capacitance and inductance, which are variations from the ideal capacitor and ideal inductor. It can be seen that a practical inductor is actually characterized by parasitic inductance and resistance. These are sometimes provided with the normal component specifications, or they can be measured in free space. These parasitic components can be incorporated into the circuit modeling to achieve the desired matching circuit characteristics. By conformably molding the matching circuit on the printed circuit assembly, the dielectric constant around the inductors and capacitors is changed due to, amongst other things, modification of the parasitic capacitance of the inductor as well as that of the capacitor. The result is that the overall matching is degraded from that of free space since the effective component model has changed from that of one in free space. The effects are usually more pronounced at higher frequencies.

This effect is well demonstrated in FIG. 3, where the high band return loss has shifted down in frequency and more importantly its bandwidth is reduced. The frequency shift can be dealt with by designing the matching in such a way that after overmolding and the resulting frequency shift we obtain the correct center frequency. However, the reduced bandwidth is not easy to compensate for and in wider band antennas cannot be recovered.

Another characteristic of the molding material, and in fact any molding or conformal coating compound, is the dissipation factor. The dissipation factor is a measure of the dielectric loss of a material. The dielectric loss angle of an insulating material is the angle by which the phase difference between applied voltage and resulting current in a capacitor, with the dielectric exclusively of the dielectric material, deviates from 90 degrees. The dielectric dissipation factor tan δ of an insulating material is the tangent of the loss angle d. In a perfect dielectric, the voltage wave and the current are exactly 90° out of phase. As the dielectric becomes less than 100% efficient, the current wave begins to lag the voltage in direct proportion. The amount that the current wave deviates from being 90° out of phase with the voltage is defined as the dielectric loss angle. The tangent of this angle is known as the loss tangent or dissipation factor. A low dissipation factor is important for plastic insulators in high frequency applications such as radar equipment and microwave parts; smaller values mean better dielectric materials. High dissipation factors usually translate to power being dissipated in the component rather than making it to the intended load (in this case, the antenna).

The dissipation factor of air is typically 0.0001, whereas typical overmolding materials are in the range 0.001 to 0.020. Depending on the material used, there can also be a frequency dependant effect (it may increase or decrease with frequency, or it may stay relatively constant). FIG. 4 illustrates the difference in the measured gain between an antenna assembly that has been overmolded and an antenna assembly that has not been overmolded in accordance with the prior art. Antenna gain is one way to measure the power loss in the matching network, since power that isn't radiated from the antenna itself is dissipated in the matching network and/or the source. As shown in FIG. 4 where the antenna, matching circuit, and connector are not encapsulated the gain is higher because the surrounding dielectric is air, which has a very low dissipation factor. Where the antenna, matching circuit, and connector are encapsulated the gain is lower due to the higher dissipation factor of the overmolding material.

The effects described above, which make it difficult to design overmolded antennas with wideband characteristics, have been addressed by attempting to model the effects of the overmolding on the parts, or simply using an ad hoc experimental method to adjust the ideal component values to provide the desired response. These solutions are disadvantageous in that it is extremely difficult to provide the desired antenna matching response because of the parasitic effects.

SUMMARY

In accordance with one embodiment of the invention an antenna assembly, comprises an antenna and a printed circuit assembly having a matching circuit. A cover is disposed over the printed circuit assembly. The cover has an inner surface and an outer surface. A gap is maintained between the matching circuit and the inner surface of the cover.

Other features and advantages of embodiments of the present invention will be apparent from the accompanying drawings, and from the detailed description, that follows below.

BRIEF DESCRIPTION OF THE DRAWINGS

The invention may be best understood by referring to the following description and accompanying drawings that are used to illustrate embodiments of the invention. In the drawings.

DESCRIPTION OF THE INVENTION

An apparatus and method for providing a broadband antenna is disclosed. For one embodiment of the invention, a molded antenna structure is provided having a gap between electrical components on the printed circuit assembly (PCA) and an overmolding of the antenna structure. One embodiment of the invention substantially reduces the degradation of the antenna performance in wideband modes of operation compared with prior art overmolding schemes.

For one embodiment of the invention, the gap between the electrical components and the overmolding is formed by implementing a "cap" (covering) over the components on the PCA such that they are substantially surrounded by air between the cap and the PCA surface. The matching circuit of the antenna system is substantially surrounded by air having a dielectric constant of 1.00054, therefore, the effective increase on the parasitic capacitance is negligible. With the cap in place, conventional overmolding of the entire assembly can be performed. In accordance with one embodiment of the invention the overmolding with the cap in place provides protection for the electrical components in the matching network mounted in the PCA and mechanically rigid structure for the connector, PCA and lower hinge while allowing a manufacturing process which is consistent with present overmolding techniques.

In the following description, numerous specific details are set forth. However, it is understood that embodiments of the invention may be practiced without these specific details. In other instances, well-known circuits, structures and techniques have not been shown in detail in order not to obscure the understanding of this description.

Reference throughout the specification to "one embodiment" or "an embodiment" means that a particular feature, structure, or characteristic described in connection with the embodiment is included in at least one embodiment of the present invention. Thus, the appearance of the phrases "in one embodiment" or "in an embodiment" in various places throughout the specification are not necessarily all referring to the same embodiment. Furthermore, the particular features, structures, or characteristics may be combined in any suitable manner in one or more embodiments.

Moreover, inventive aspects lie in less than all features of a single disclosed embodiment. Thus, the claims following the Detailed Description are hereby expressly incorporated into this Detailed Description, with each claim standing on its own as a separate embodiment of this invention.

Figure 1:
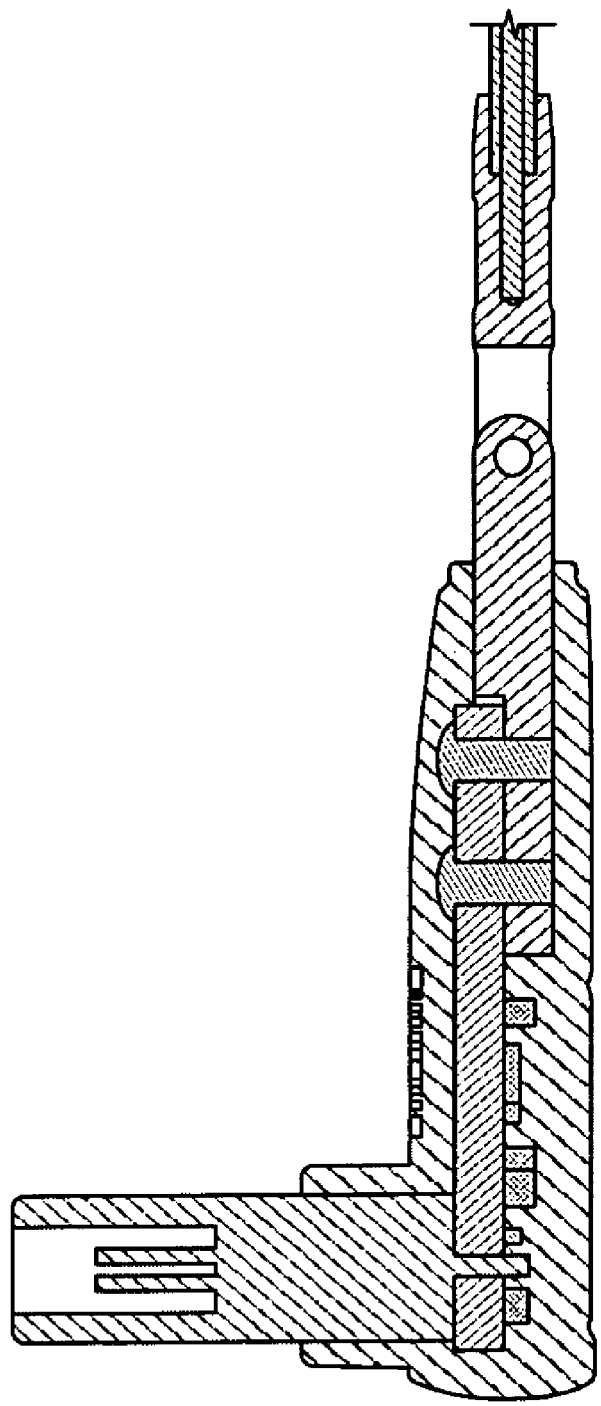
FIG. 1 illustrates an exemplary dual band antenna providing an overmolding in accordance with the prior art.
Figure 2:
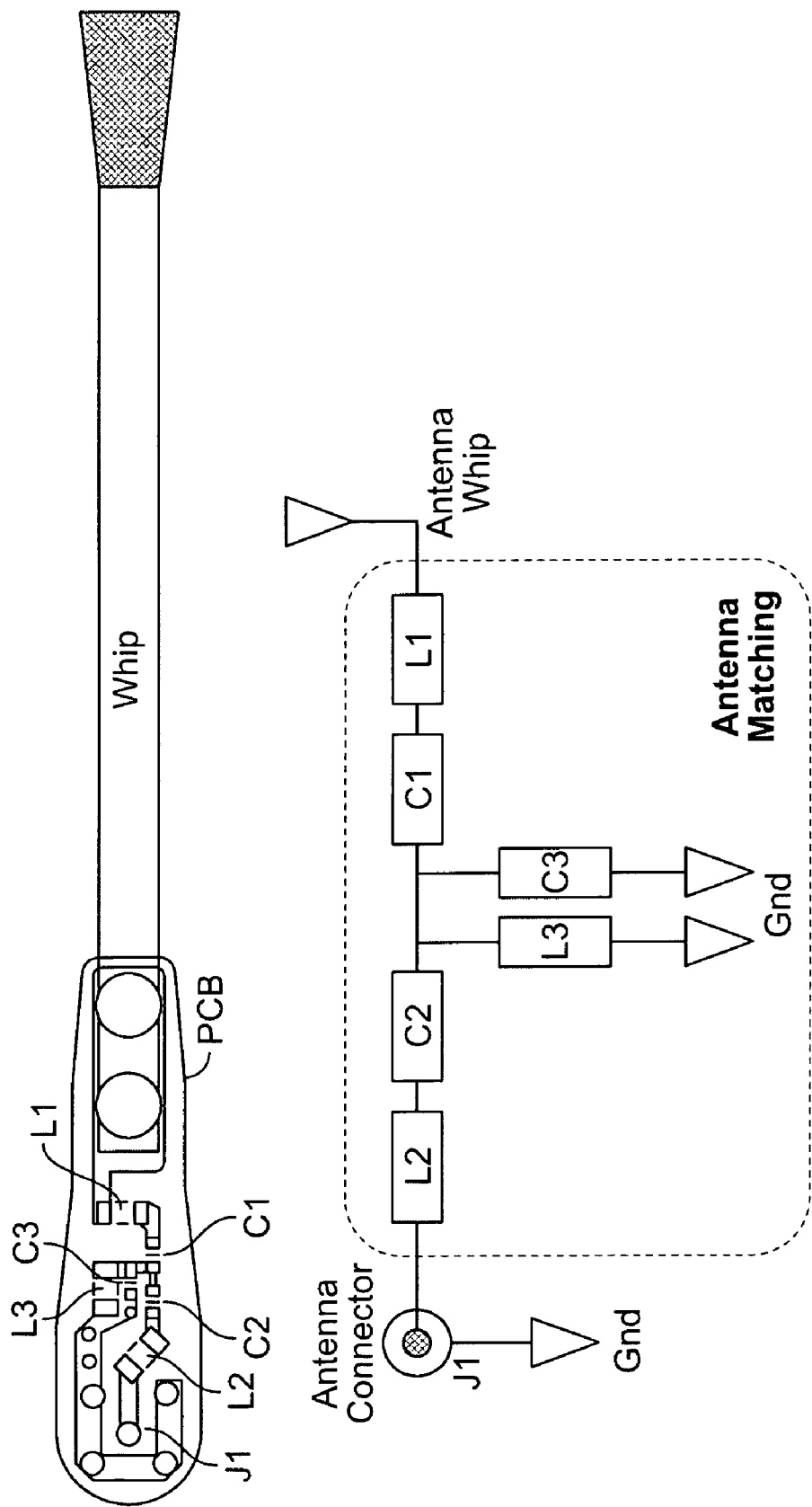
FIG. 2 illustrates the matching circuit of a conventional dual band antenna in accordance with the prior art.
Figure 3:
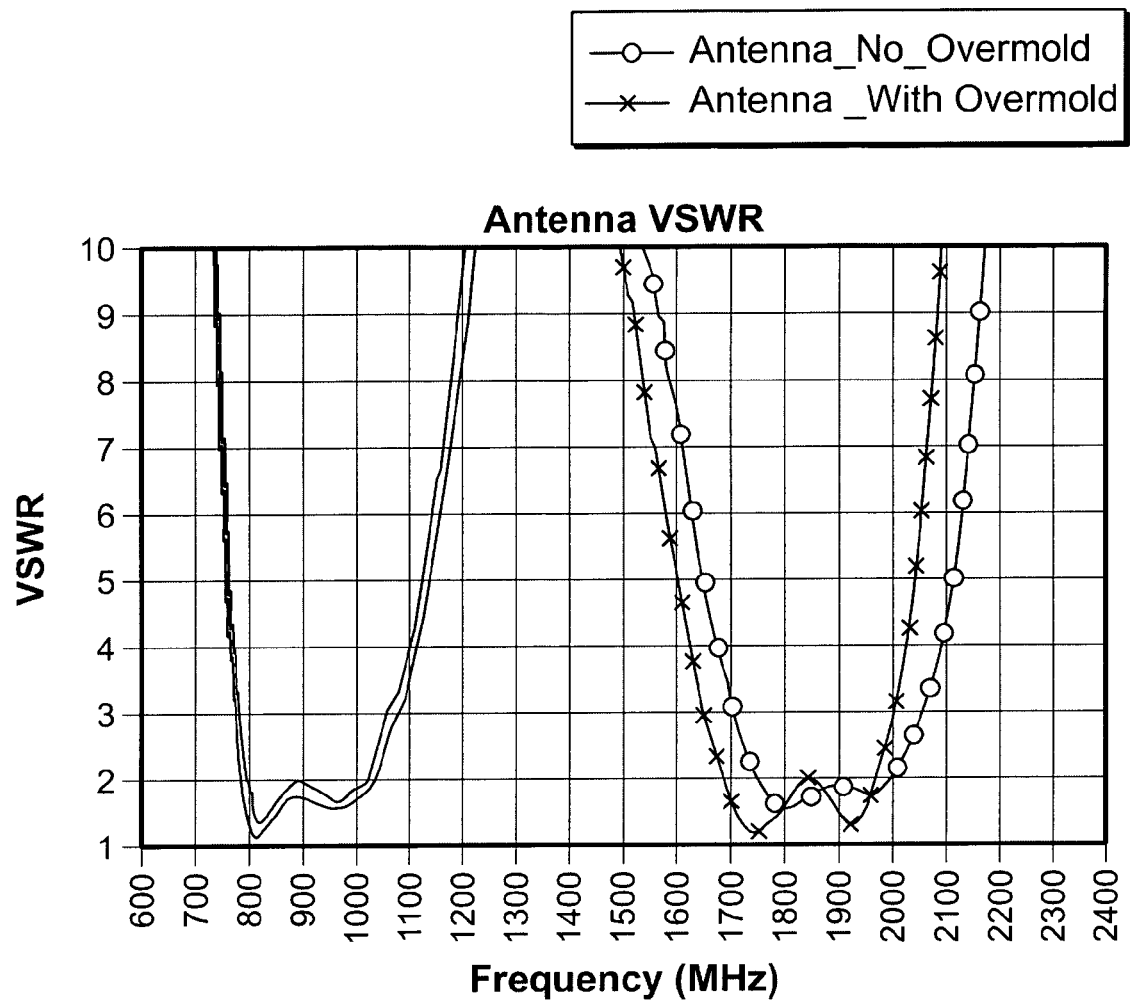
FIG. 3 illustrates the difference in the measured bandwidth between an antenna assembly that has been overmolded and an antenna assembly that has not been overmolded in accordance with the prior art.
Figure 4:
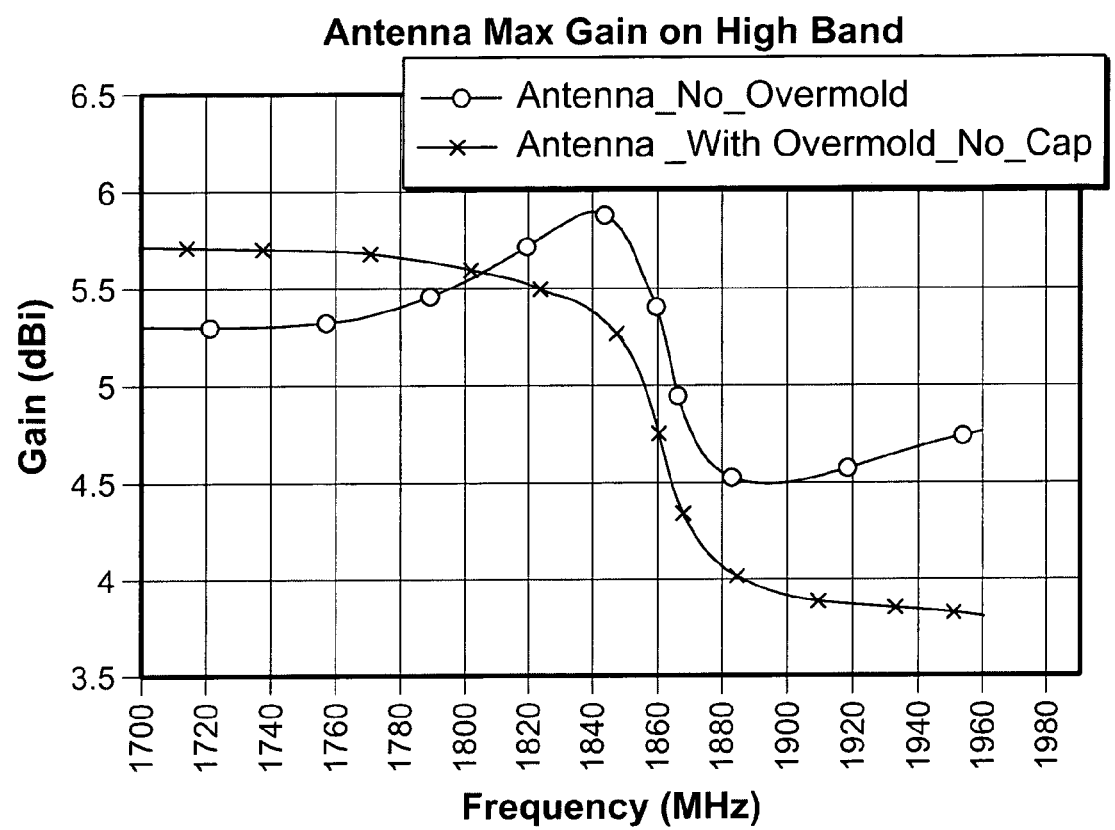
FIG. 4 illustrates the difference in the measured gain between an antenna assembly that has been overmolded and an antenna assembly that has not been overmolded in accordance with the prior art.
Figure 5A:
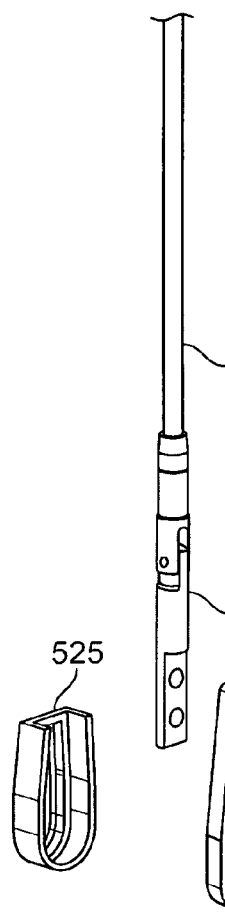
FIGS. 5A-5C illustrate the assembly of an antenna system in which a cap is placed over electrical components of antenna system in accordance with one embodiment of the invention.
Figure 5B:
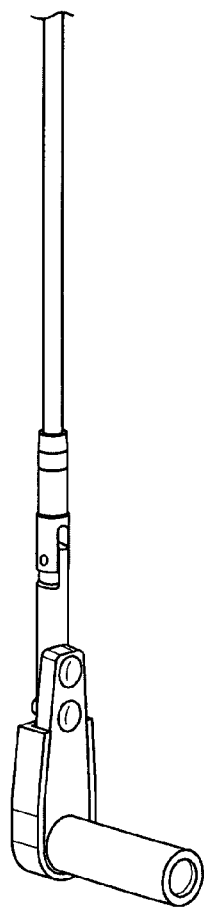
Figure 5C:
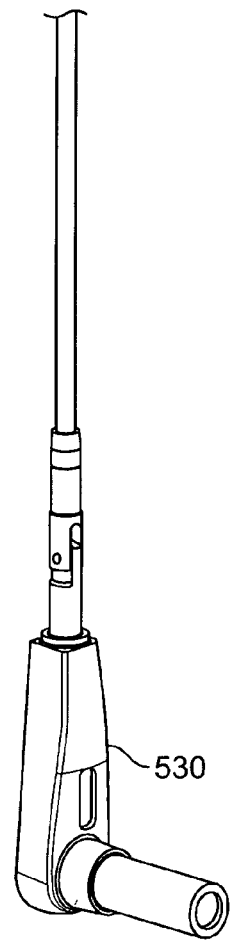

FIGS. 5A-5C illustrate the assembly of an antenna system in which a cap is placed over electrical components of antenna system in accordance with one embodiment of the invention. System 500, shown in FIG. 5, includes an antenna radiating element 505, a hinge 510, a connector 515 coupled to the hinge, rivets 520 for securing the hinge 510 to the antenna radiating element 505 and a cap 525. The cap 525 is placed over the electronic components of the antenna matching circuit (not shown) as shown in FIG. 5B. The plastic base 530 of the antenna structure is formed in a conventional manner with the cap 525 in place as shown in FIG. 5C.

The cap maintains a gap between the electrical components of the antenna matching circuit and the overmolding. Since the air volume around the matching circuit is substantially air with a dielectric constant of 1.00054, the effective increase on the parasitic capacitance is negligible. There will still be some small effect due to the proximity of the thermoplastic elastomer of the overmolding, but the overall effect is substantially reduced in comparison to conventional schemes.

Figure 6:
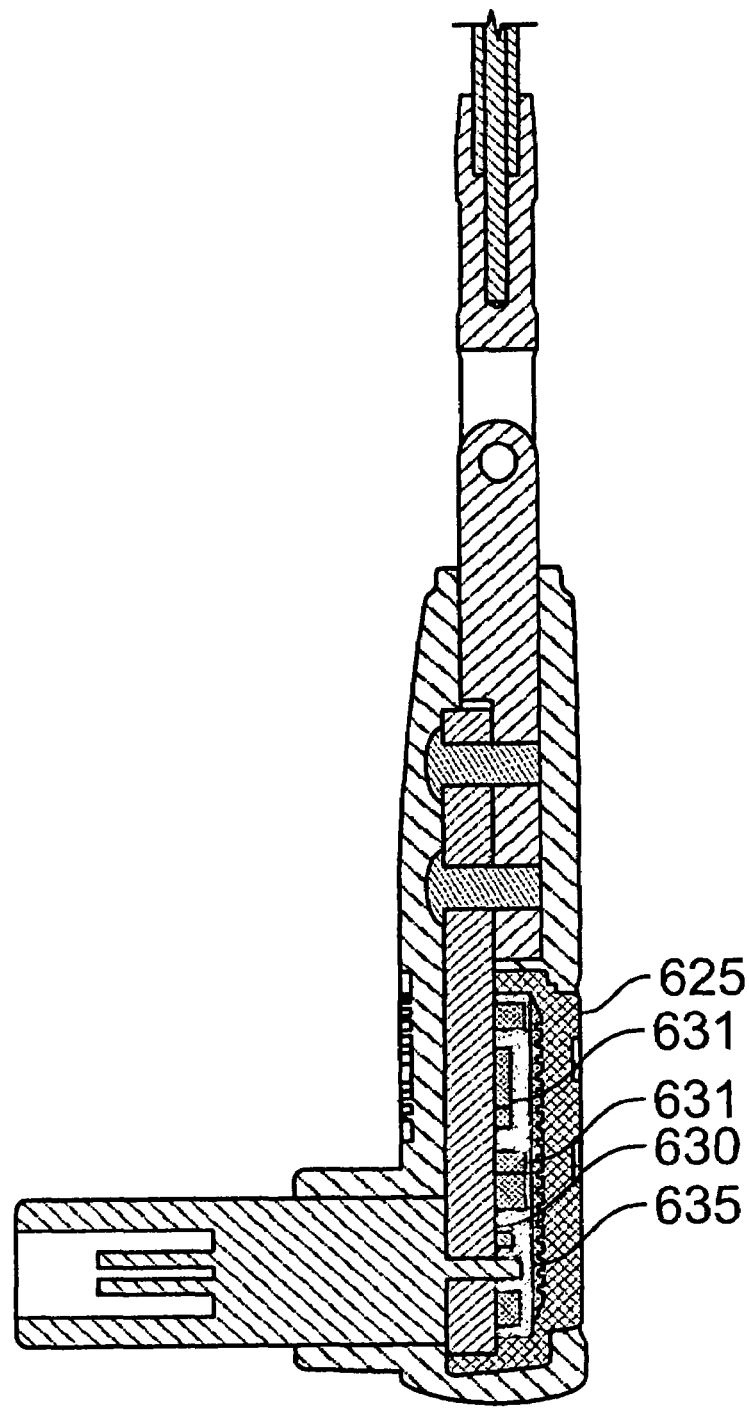
FIG. 6 illustrates a cross sectional view of an antenna assembly having a cap placed over the components of the matching circuit in accordance with one embodiment of the invention.

FIG. 6 illustrates a cross sectional view of an antenna assembly having a cap placed over the components of the matching circuit in accordance with one embodiment of the invention. As shown in FIG. 6, antenna assembly 600 has a cap 625 covering PCA 630 and providing an air cavity 635 between electrical components of the antenna matching circuit 631, implemented on the PCA 630 and an internal surface of cap 625. The air cavity 635 around the matching circuit components 631 reduces the component stray capacitance and the dissipation factor, which makes the matching circuit function more closer to an ideal matching circuit. It will not act exactly the same as a matching circuit surrounded by free space, since the air cavity only reduces the effect of the high dielectric thermoplastic elastomer.

Figure 7:
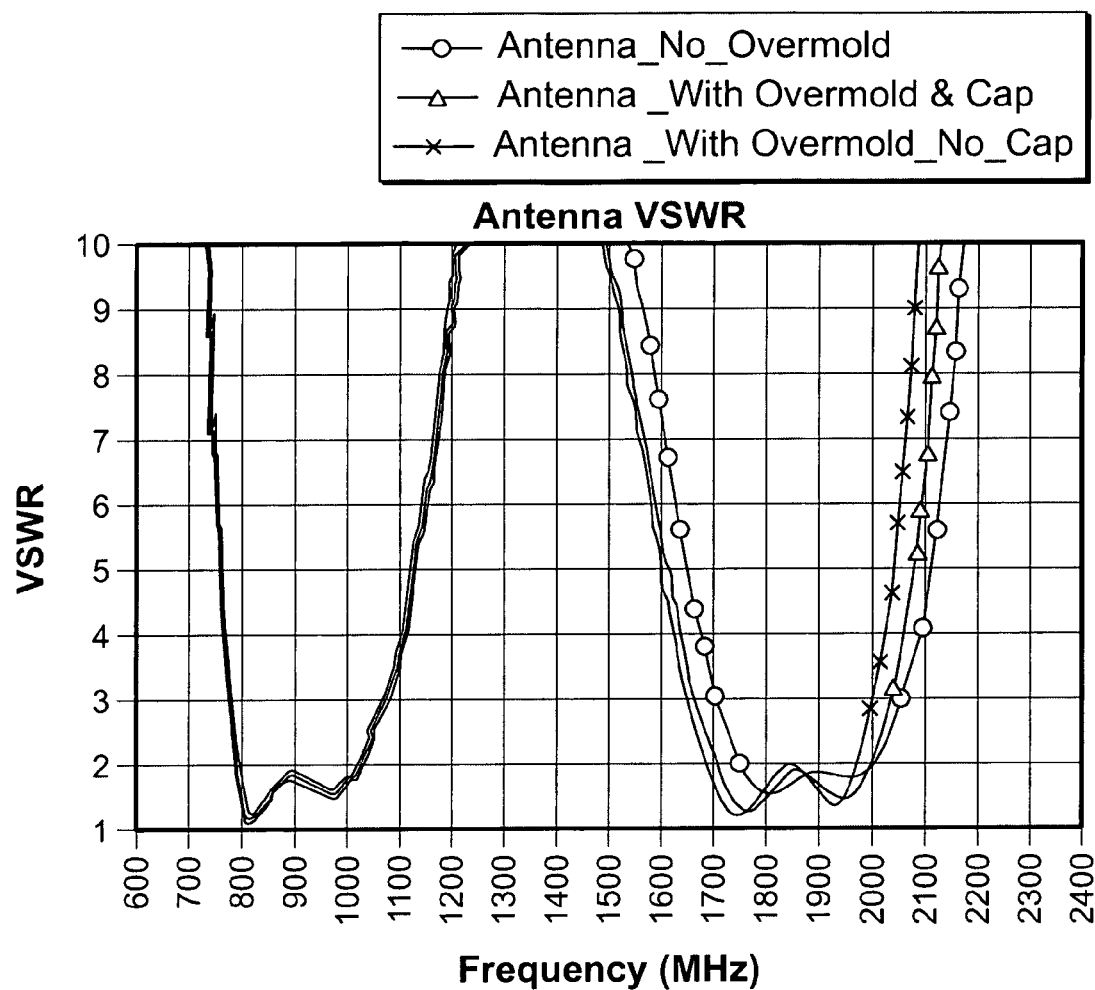
FIG. 7 illustrates the difference in the measured bandwidth between an antenna assembly that has been overmolded conventionally, an antenna assembly that has not been overmolded, and an antenna that has been overmolded with a cap in accordance with one embodiment of the invention.

FIG. 7 illustrates the difference in the measured bandwidth between an antenna assembly that has been overmolded conventionally, an antenna assembly that has not been overmolded, and an antenna that has been overmolded with a cap in accordance with one embodiment of the invention.

As illustrated by FIG. 7, in which the VSWR was measured for the same antenna with no overmolding (o), with conventional overmolding (x), and with overmolding with a cap (Δ). The VSWR for the case of the air cavity around the matching circuit is shown in FIG. 7 and compared with the VSWR when the matching network is totally encased in the thermoplastic elastomer and when it is surrounded by free space. As shown in FIG. 7 the use of the cap to achieve the air cavity in the overmolding has resulted in a small shift of the passband relative to the free-space situation (antenna with no overmold), whereas completely overmolding the antenna has not only shifted the passband but reduced the bandwidth as well. The use of the cap, which reduces parasitic capacitance and inductance, also increase the useful bandwidth of the antenna for a given matching circuit.

Figure 8:
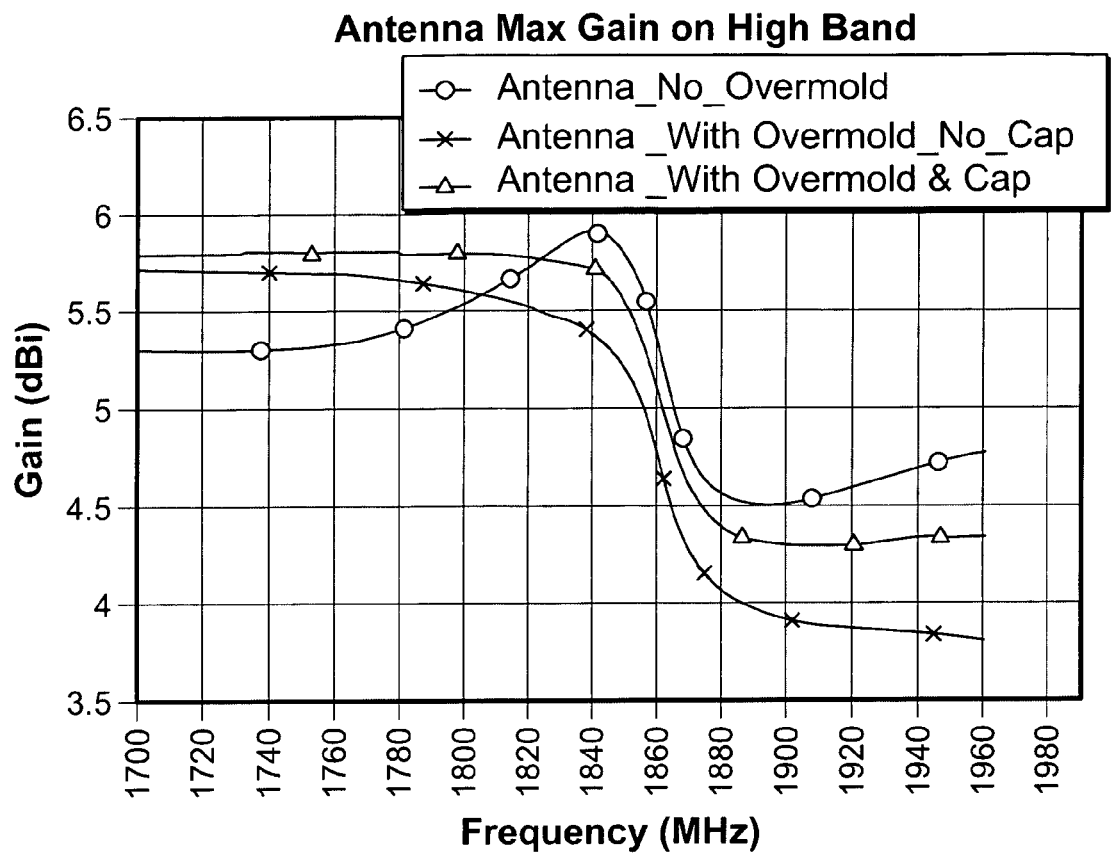
FIG. 8 illustrates the difference in the measured gain between an antenna assembly that has been overmolded conventionally, an antenna assembly that has not been overmolded, and an antenna that has been overmolded with a cap in accordance with one embodiment of the invention.

FIG. 8 illustrates the difference in the measured gain between an antenna assembly that has been overmolded conventionally, an antenna assembly that has not been overmolded, and an antenna that has been overmolded with a cap in accordance with one embodiment of the invention.

As shown in FIG. 8, the antenna gain peaking at the band edge is reduced for the Cap and Air Cavity case relative to the antenna operating in free-space. The case with the assembly totally encased in the overmold material shows significant roll-off compared to the cap and air cavity case.

Figure 9:
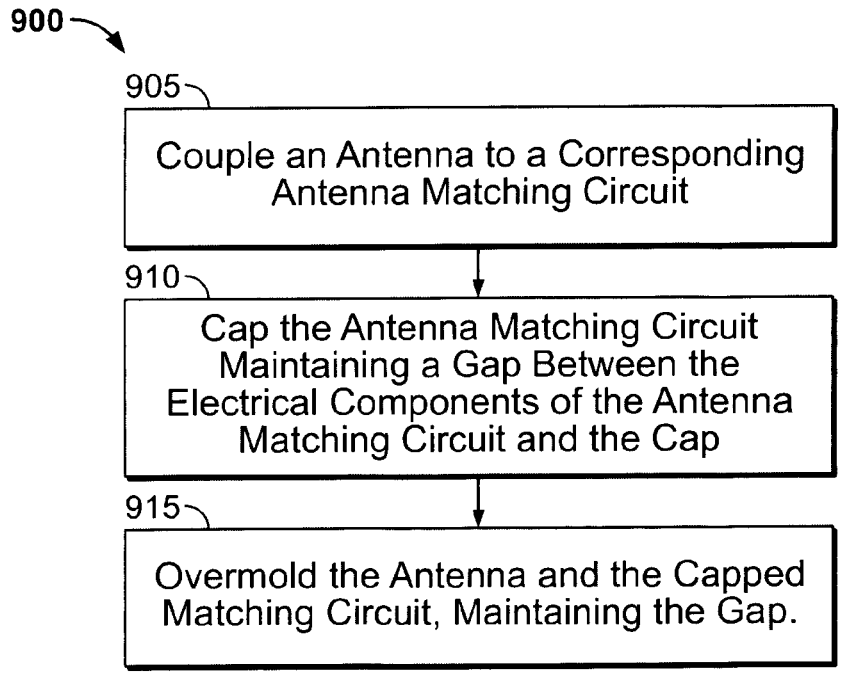
FIG. 9 illustrates a process by which an antenna structure is providing having a gap between the electrical components of the antenna matching circuit and the antenna overmolding.

FIG. 9 illustrates a process by which an antenna structure is providing having a gap between the electrical components of the antenna matching circuit and the antenna overmolding. Process 900, shown in FIG. 9, begins at operation 905 in which an antenna is coupled to an antenna matching circuit. The matching circuit is designed to provide a desired matching function for the antenna. For one embodiment of the invention, the antenna matching circuit is coupled to a connector to connect the antenna to wireless communication device.

At operation 910 a cap is formed over the matching circuit of the antenna. The cap is formed so that a gap is maintained between the electrical components (e.g., inductors and capacitors) of the antenna matching circuit and the interior surface of the cap.

At operation 915 the antenna, the capped antenna matching circuit, and the connector are overmolded using conventional overmolding techniques. The cap formed over the antenna matching circuit maintains the gap between the electrical components of the antenna matching circuit and the inner surface of the overmolded cap. For one embodiment of the invention the cap and overmolding are formed from the same material. For alternative embodiments, a dissimilar material to that used in the overmolding can be used to fabricate the cap. Such embodiments are effected through methods similar to those described above.

Embodiments of the invention have been described as including various operations. Many of the processes are described in their most basic form, but operations can be added to or deleted from any of the processes without departing from the scope of the invention. For example, alternative embodiments of the invention may provide a gap between the electrical components of the antenna matching circuit and the overmolding in other ways. For example, for one embodiment of the invention a material which is soluble in some solvent could be coated over the matching network to form a barrier around the matching network. After coating with this soluble material, the thermoplastic elastomer (overmolding) can be applied over the assembly. A solvent can then be flushed through the inside of the assembly to dissolve the soluble material and form a void. For one embodiment the gap may be an air gap, while in other embodiments the gap may be filled with a gas other than air or another suitable material.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. An antenna assembly, comprising:
   an antenna;
   a printed circuit assembly having a matching circuit; and
   an overmolding having an inner surface and an outer surface disposed over the printed circuit assembly, the overmolding maintaining a gap between the matching circuit and the inner surface of the overmolding.

2. The antenna assembly of claim 1 wherein the gap comprises an air cavity around the matching circuit.

3. The antenna assembly of claim 1 wherein the gap is maintained by a cap disposed between the matching circuit and the overmolding.

4. The antenna assembly of claim 3 wherein the cap and the overmolding are comprised of a same material.

5. The antenna assembly of claim 4 wherein the same material is a thermoplastic.

6. The antenna assembly of claim 1 wherein the antenna is one of a multi-band antenna, or a single-band antenna with broadband characteristics.

7. The antenna assembly of claim 1 further comprising:
   a connector coupled to the printed circuit assembly, a portion of the connector encapsulated by the overmolding.

8. A method comprising:
coupling an antenna to an antenna matching circuit;
placing a cap over the antenna matching circuit, the cap maintaining a gap between the matching circuit an inner surface of the cap; and
overmolding a portion of the antenna and the capped matching circuit.

9. The method of claim 8 wherein the gap comprises an air cavity around the matching circuit.

10. The method of claim 8 wherein the cap and the overmolding are comprised of a same material.

11. The method of claim 10 wherein the same material is a thermoplastic.

12. The method of claim 8 wherein the antenna is one of a multi-band antenna, or a single-band antenna with broadband characteristics.

13. The method of claim 8 further comprising:
coupling a connector to the matching circuit and overmolding a portion of the connector.

14. A method comprising:
coupling an antenna to a printed circuit assembly having a matching circuit;
coating the matching circuit with a soluble material;
overmolding a portion of the antenna and the coated matching circuit; and
dissolving the soluble material to form a gap between the matching circuit and an inner surface of an overmolding.

15. The method of claim 14 wherein the gap comprises an air cavity around the matching circuit.

16. The method of claim 14 wherein the overmolding is comprised of a thermoplastic.

17. The method of claim 14 wherein the antenna is one of a multi-band antenna, or a single-band antenna with broadband characteristics.

18. The method of claim 14 further comprising:
coupling a connector to the matching circuit and overmolding a portion of the connector.

* * * * *